(12) United States Patent
Jablonski

(10) Patent No.: US 8,136,545 B2
(45) Date of Patent: Mar. 20, 2012

(54) APPARATUS TO REGULATE FLUID FLOW

(75) Inventor: Jason Jablonski, Zimmerman, MN (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 958 days.

(21) Appl. No.: 12/123,608

(22) Filed: May 20, 2008

(65) Prior Publication Data

US 2009/0288718 A1 Nov. 26, 2009

(51) Int. Cl.
*F16K 31/26* (2006.01)
(52) U.S. Cl. .......................... 137/492; 251/35
(58) Field of Classification Search .................. 137/488, 137/489, 489.5, 492; 251/35
See application file for complete search history.

(56) References Cited

U.S. PATENT DOCUMENTS

| 1,146,009 | A | * | 7/1915 | Mason | 137/245 |
|---|---|---|---|---|---|
| 2,000,002 | A | * | 4/1935 | Stockmeyer | 251/35 |
| 3,177,891 | A | * | 4/1965 | Reese | 137/495 |
| 3,367,621 | A | * | 2/1968 | Griswold | 251/35 |
| 3,712,578 | A | * | 1/1973 | Dawson | 251/35 |
| 3,913,884 | A | * | 10/1975 | Rolfe | 251/35 |
| 6,971,625 | B2 | * | 12/2005 | Szymaszek et al. | 251/28 |

* cited by examiner

*Primary Examiner* — Stephen M Hepperle
*Assistant Examiner* — William McCalister
(74) *Attorney, Agent, or Firm* — Hanley, Flight & Zimmerman, LLC

(57) ABSTRACT

Apparatus to regulate fluid flow are disclosed. The apparatus includes an example regulator valve and an example automatically-adjusting or self-adjusting amplifier valve to maintain fluid flow during low downstream demand fluid flow conditions, and to maintain the operational accuracy and stability of the regulator valve during higher downstream demand fluid flow conditions.

17 Claims, 2 Drawing Sheets

APPARATUS TO REGULATE FLUID FLOW

FIELD OF THE DISCLOSURE

This disclosure relates generally to fluid flow regulators and, more particularly, fluid flow apparatus that includes a self-adjusting fluid amplifier to improve the stability of the fluid flow.

BACKGROUND

Industrial processing plants use regulator valves in a wide variety of applications such as, for example, controlling the flow of a fluid (e.g., a gas, liquid, etc.) in a processing operation. The regulation of the flow of gas requires that a regulator valve provide and maintain a low flow rate of gas until the fluid flow system requires that the regulator valve provide a higher flow rate. However, due to the instability of certain types of regulator valves at low flow rate conditions, the regulator valve may tend to close after opening. This on-off type of behavior may require that a technician manually open a flow restriction in the flow system so that a low flow rate is maintained at all times. However, this may result in a reduced accuracy of operation of the regulator valve during subsequent increased flow conditions. Also, if the regulator valve is subject to a cyclical flow demand, it is not always possible to have a technician available to adjust the flow restriction.

SUMMARY

An apparatus to adjust the gain of a regulated fluid flow system includes a fluid amplifier valve to receive fluid flow associated with an inlet of a regulator valve and to provide an adjusted fluid flow to a valve mechanism and to one side of a valve member of the regulator valve. The fluid amplifier valve has a flow pin at an amplifier orifice and the flow pin is connected to the valve member of the regulator valve. Changes in the fluid flow at an outlet of the regulator valve cause the valve mechanism to regulate the adjusted fluid flow and to simultaneously move the valve member and the flow pin to vary the gain of the regulated fluid flow system.

DETAILED DESCRIPTION

Figure 1:
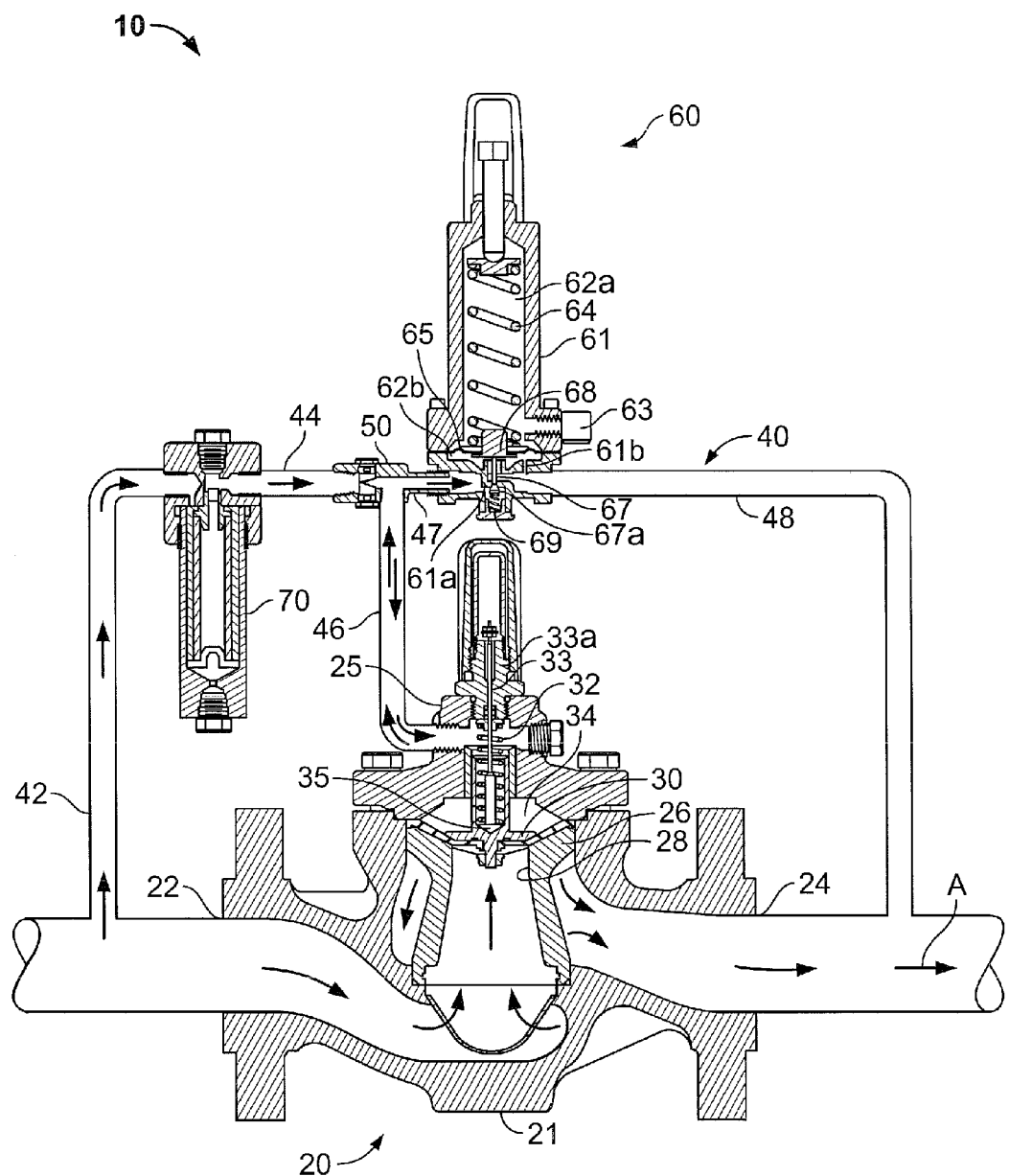
FIG. 1 is a cut-away illustration of a known fluid flow system.

In general, the example apparatus and methods described herein may be utilized for regulating fluid flow in various types of fluid flow processes. Additionally, while the examples described herein are described in connection with the control of product flow for the industrial processing industry, the examples described herein may be more generally applicable to a FIG. 1 illustrates a known fluid flow system 10 having a regulator valve 20, a restrictor 50, a pilot valve 60, and a fluid filter 70. The regulator valve 20 has a valve housing 21, an inlet 22, an outlet 24, a loading pressure inlet 25, a valve seat 26 at a valve passage 28, and a valve member 30. The valve member 30 is urged toward contact with the valve seat 26 by a resilient member 32 (e.g., a spring) contained in a loading pressure chamber 34. The resilient member 32 engages an end 35 of the valve member 30 opposite a spring force adjuster 33a having a rod 33 disposed slidably in the housing 21.

The fluid flow system 10 also includes a bypass or fluid connection 40. The fluid connection 40 has a connection portion 42 that transmits inlet fluid pressure to the fluid filter 70, a connection portion 44 that transmits inlet fluid pressure to the manually-operated restrictor 50, a connection portion 46 that transmits a reduced inlet fluid pressure or loading fluid pressure to the loading pressure inlet 25 of the regulator valve 20, a connection portion 47 that transmits loading fluid pressure to the pilot valve 60, and a connection portion 48 that transmits outlet fluid pressure at the outlet 24 to the pilot valve 60.

The pilot valve 60 includes a housing 61, a chamber 62a vented to atmosphere at vent 63, and a manually-adjustable spring 64 engaging a diaphragm 65. A valve member module 68 is attached to the diaphragm 65 and has a slidable valve member 67 with a valve head 67a engaging a valve head spring 69. The valve head 67a controls fluid flow at a valve seat 61a. The housing 60 includes a fluid inlet 61b that communicates outlet fluid side of the diaphragm 65 opposite the chamber 62a.

The fluid restrictor 50 reduces or limits the inlet fluid flow and pressure received from the connection portion 42 so that the reduced inlet fluid pressure or loading fluid pressure is transmitted via connection portion 46 to the loading pressure inlet 25 and the loading pressure chamber 34 of the regulator valve 20. The loading fluid pressure is also transmitted by the connection portion 47 to the valve head 67a at the valve head seat 61a of the pilot valve 60. Typically, the valve head 67a is not engaged with the valve head seat 61a so that the loading fluid pressure may flow past the valve head seat 61a to the connection portion 48.

The primary function of the regulator valve 20 is to match the flow of fluid through the regulator valve 20 to the downstream demand for fluid flow (i.e., downstream demand being fluid flow demand in the direction of a flow arrow A in FIG. 1) in the fluid flow system 10. At the same time, the regulator valve 20 must maintain a fluid flow pressure within certain limits at the outlet 24 of the fluid flow system 10. When the downstream demand for fluid flow in the direction of the fluid flow arrow A is constant, the valve head 67a is separated from the valve seat 61a of the pilot valve 60 so the loading pressure transmitted to the connection portion 46, the loading pressure inlet 25, and the loading pressure chamber 34 maintains the position of the valve member 30 in the regulator valve 20. When the downstream demand for fluid flow in the fluid flow system 10 changes, the changed pressure at the outlet 24, the connection portion 48, and in the chamber 62b of the pilot valve 60 pilot valve 60 causes an adjustment of the loading pressure transmitted to the loading pressure chamber 34 to reposition and then maintain the position of the valve member 30 of the regulator valve 20.

For example, when there is an increase in the downstream demand for fluid flow in the direction of the flow arrow A of the fluid flow system 10, the fluid pressure in the connection portion 48 and the chamber 62b decreases to enable a slight downward movement of the diaphragm 65 and results in the valve head 67a moving downwardly and away from the valve head seat 61a. The downward movement of the valve head 67a permits more loading pressure in the connection portion 47 to escape downstream to the connection portion 48 faster than fluid pressure in connection portion 44 can bleed through the restrictor 50. This reduces the loading pressure in the connection portion 46, the loading pressure inlet 25 and the loading pressure chamber 34 so that the fluid pressure at valve passage 28 forces the valve member 30 away from the valve seat 26 to increase the fluid flow to the housing outlet 24. Likewise, a reduction in the downstream demand for fluid flow in the fluid flow system 10 causes the fluid pressure in the connection portion 48 and the housing chamber 62b of the pilot valve 60 to increase and move the diaphragm 65 upwardly toward the valve head seat 61a. The upward movement of the diaphragm 65 displaces the valve head 67a upwardly to restrict fluid flow through the valve head seat 61a to cause correspondingly an increase in the loading pressure transmitted to the loading pressure chamber causes the valve member 30 to move toward the valve seat 26 to reduce the fluid flow through the valve passage 28 to the outlet 24.

In FIG. 1, the pilot valve 60 and the restrictor 50 function to change the operational sensitivity of the regulator valve 20. If a change in the pressure of the downstream fluid flow of the fluid flow system 10 can be sensed and translated into a larger change in the loading fluid pressure, the regulator valve 20 will be more sensitive to changes in the downstream demand for fluid flow. The pilot valve 60 accomplishes an amplification of the loading fluid pressure relative to the downstream fluid pressure, and the amount of amplification is called a gain or pilot gain. Thus, a change in the loading fluid pressure per a change in the downstream fluid pressure moves the valve member 30 to a corresponding position to regulate the fluid flow through the regulator valve 20.

However, at low fluid flow conditions in the fluid flow system 10 of FIG. 1, the regulator valve 20 tends to operate in an unstable on-off fashion (e.g., may limit cycle or oscillate between an open condition and a closed condition). When the regulator valve 20 has a small amount of fluid flow through the valve seat 26, the regulator valve 20 may close and stop fluid flow instead of remaining open to provide a relatively stable amount of fluid flow to the outlet 24. To help minimize this unstable on-off operation of the fluid flow system 10, a technician may open manually the restrictor 50 a small amount to increase the amount of inlet fluid flow communicated to the connection portion 46 to achieve a reduction in the pilot gain and to enable the position. However, this reduction in the pilot gain also reduces the accuracy of the operation of the regulator valve 20 when there is an increase in the downstream demand for fluid flow. In other words, the adjustment of the restrictor 50 to increase the inlet fluid flow to the connection portion 46 provides additional stability in the initial operation of the fluid flow system 10 but also results in a decrease overall in the accuracy of the operation of the fluid flow system 10. Additionally, the technician is required to adjust manually the restrictor 50 when the fluid flow system 10 is placed in service. However, for fluid flow systems that have a cyclical flow demand, the technician may not always be available to adjust the restrictor 50 as the flow demand changes.

Figure 2:
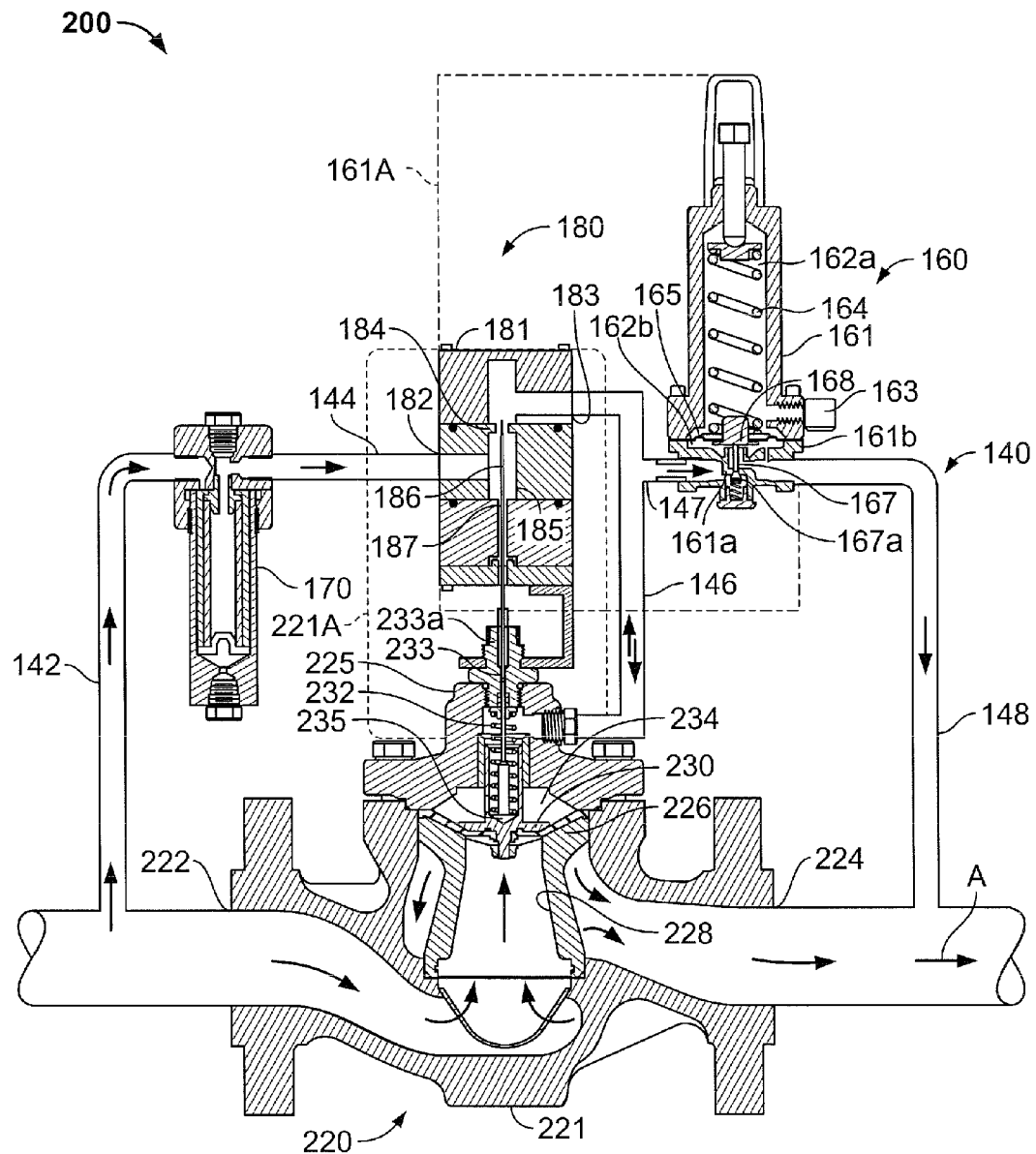
FIG. 2 is a cut-away illustration of a fluid flow system having an example regulator valve and an example self-adjusting amplifier valve.

FIG. 2 is a cut-away illustration of a fluid flow system 200 having an example regulator valve 220 and an example automatically-adjusting or self-adjusting amplifier valve 180. Structural devices in the fluid flow system 200 of FIG. 2 that are the same as or similar to the structural devices in the fluid flow system 10 of FIG. 1 have the same reference numerals increased by 100. The fluid flow system 200 includes a pilot valve 160 and a fluid filter 170. The example regulator valve 220 has a housing 221, an inlet 222, an outlet 224, a loading pressure inlet 225, a valve seat 226 at a valve passage 228, and a valve member 230. The valve member 230 is urged toward contact with the valve seat 226 by a resilient member 232 located in a loading pressure chamber 234. The resilient member 232 engages an end 235 of the valve member 230 opposite a spring force adjuster 233a having a rod 233 disposed slidably in the housing 221. The rod 233 extends from the spring force adjuster 233a to be connected to or integral with a travel connector 187 extending from the example self-adjusting amplifier valve 180. The rod 233 and the travel connector 187 together provide a fixed length connection so that the rod 233 and an amplifier metering pin or flow pin 186 travel the same distance when displaced.

The fluid flow system 200 also includes a bypass or fluid connection 140. The fluid connection 140 has a connection portion 142 that transmits inlet fluid pressure to the fluid filter 170, a connection portion 144 that transmits inlet fluid pressure to the example self-adjusting amplifier valve 180, a connection portion 146 that transmits a reduced inlet fluid pressure or loading fluid pressure to the loading pressure inlet 225 of the example regulator valve 220, a connection portion 147 that transmits the loading fluid pressure to the pilot valve 160, and a connection portion 148 that transmits outlet fluid pressure at the outlet 224 to the pilot valve 160.

The pilot valve 160 of FIG. 2 is identical to the pilot valve 60 described above for FIG. 1, and, therefore, will not be described again.

The example self-adjusting or automatically-adjusting amplifier valve 180 includes an amplifier housing 181 with an amplifier inlet 182, an amplifier outlet 183, an amplifier orifice 184 located in an amplifier chamber 185, and the amplifier flow pin 186 connected to the travel connector 187. The amplifier flow pin 186 and the amplifier orifice 184 restrict or limit inlet fluid pressure between the amplifier inlet 182 and the amplifier outlet 183. The travel connector 187 connects the amplifier flow pin 186 to the rod 233 extending from the spring force adjuster 233a.

The example self-adjusting amplifier valve 180 reduces or limits the inlet fluid pressure received from the connection portion 142 and transmitted as a loading fluid pressure via the connection portion 146 to the loading pressure inlet 225 and the loading pressure chamber 234 of the example regulator valve 220. The loading fluid pressure is also transmitted by the connection portion 147 to a valve head 167a at a valve head seat 161a of the pilot valve 160. Typically, the valve head 167a is not engaged with the valve head seat 161a so that the loading fluid pressure may flow past the valve head seat 161a to the connection portion 148.

The primary function of the regulator valve 220 is to match the flow of fluid through the regulator valve 220 to the downstream demand for fluid flow (i.e., the downstream demand being fluid flow demand in the direction of a flow arrow A in FIG. 2) in the fluid flow system 200. At the same time, the regulator valve 220 must maintain a fluid flow pressure within certain limits at the outlet 224 of the fluid flow system 200. When the downstream demand for fluid flow in the direction of the fluid flow arrow A is constant, the valve head 167a is separated from the valve seat 161a of the pilot valve 160 so the loading fluid pressure transmitted to the connection portion 146, the loading pressure inlet 225, and the loading pressure chamber 234 maintains the position of the valve member 230 in the regulator valve 220. When the downstream demand for fluid flow in the fluid flow system 200 changes, the changed pressure at the outlet 224, the connection portion 148, and in the chamber 162b of the pilot valve 160 causes a diaphragm 165 to react accordingly. The resulting operation of the pilot valve 160 causes an adjustment of the loading fluid pressure transmitted to the loading pressure chamber 234 to reposition and then maintain the position of the valve member 230 of the regulator valve 220.

For example, when there is an increase in the downstream demand for fluid flow in direction of the flow arrow A in the fluid flow system 200, the fluid pressure in the connection portion 148 and the chamber 162b decreases to enable a slight downward movement of the diaphragm 165 and results in the valve head 167a moving downwardly and away from the valve head seat 161a. The downward movement of the valve head 167a permits more loading fluid pressure in the connection portion 147 to escape downstream to the connection portion 148. The loading fluid pressure in the connection portions 146 and 147 escapes downstream faster than the fluid pressure in connection portion 144 can move or bleed through the amplifier orifice 184. This reduction in the loading fluid pressure in the connection portion 146, the loading pressure inlet 225, and the loading pressure chamber 234 results in the fluid pressure at the valve passage 228 forcing the valve member 230 away from the valve seat 226 to increase the fluid flow to the housing outlet 224. Likewise, a reduction in the downstream demand for fluid flow in the fluid flow system 200 causes the fluid pressure in the connection portion 148 and the housing chamber 162b of the pilot valve 160 to increase and move the diaphragm 165 upward toward the valve head seat 161a. The upward movement of the diaphragm 165 displaces the valve head 167a loading fluid pressure transmitted to the loading pressure chamber 234. The increase in the loading fluid pressure in the loading pressure chamber 234 causes the valve member 230 to move toward the valve seat 226 to reduce the fluid flow through the valve passage 228 to the housing outlet 224.

At low fluid flow conditions in the fluid flow system 200, the example regulator valve 220 operates accurately to enable a continual fluid flow between the inlet 222 and the outlet 224. When the example regulator valve 220 has a small amount of fluid flow at the outlet 224, the valve member 230 is separated a small distance from the valve seat 226 of the example regulator valve 220. The fluid pressure in the connection portion 148 causes the diaphragm 165 of the pilot valve 160 to be positioned upwardly so that the valve head 167a restricts fluid flow at the valve head seat 161a. Without the example self-adjusting amplifier valve 180 and the example regulator valve 220, the restriction of fluid flow at the valve head seat 161a could result in a higher loading fluid pressure in the connection portion 146 and the chamber 234, and cause the valve member 230 to engage the valve seat 226 and stop the fluid flow at the valve passage 228. However, the example self-adjusting amplifier valve 180 and the example regulator valve 220 operate to achieve a stable, continuous fluid flow at the valve passage 228 of the fluid flow system 200.

More specifically, the example self-adjusting or automatically-adjusting amplifier valve 180 self-adjusts the sensitivity or gain of the fluid flow system 200 during changing demand in downstream fluid flow conditions. At a low fluid flow condition, the travel connector 187 of the example self-adjusting amplifier valve 180 and the rod 233 connected to the valve member 230 have moved upwardly a small distance. The amplifier flow pin 186 connected to the travel connector 187 is positioned relative to the amplifier orifice 184 to enable a predetermined amount of loading fluid flow to flow to the amplifier outlet 183 and the connection portion 146. The predetermined amount of loading fluid flow is large enough to reduce the loading fluid pressure and maintain a low pilot gain. The fluid flow system 200 accomplishes a low pilot gain at low fluid flow conditions. Thus, the valve member 230 remains open to provide a stable, continuous fluid flow during a downstream demand for low fluid flow.

When the fluid flow system 200 has an increased downstream demand for fluid flow in the direction of the flow arrow A, the fluid pressure in the connection portion 148 decreases to enable the diaphragm 165 of the pilot valve 160 to move downwardly so that the valve head 167a permits an increase of fluid flow at the valve head seat 161a. The loading fluid pressure in the connection portions 147 and 146 is reduced so that the valve member 230 may be moved away from the valve seat 226 by fluid pressure at the valve passage 228, thereby increasing fluid flow through the example regulator valve 230. However, the upward movement of the valve member 230 causes the rod 233, the travel connector 187 and the amplifier flow pin 186 of the example self-adjusting amplifier valve 180 to move upwardly to restrict automatically the fluid flow at the amplifier orifice 184. The automatic restriction of the fluid flow at the amplifier housing valve seat 184 increases the gain of the fluid flow system 200 during the increased or higher downstream demand for fluid flow.

The example self-adjusting amplifier valve 180 and the example regulator valve 220 enable the fluid flow system 200 to accomplish a low pilot gain at low downstream fluid flow demand conditions and an increased pilot gain at higher downstream fluid flow demand conditions. Thus, the use of the example regulator valve 220 and the example self-adjusting amplifier valve 180 maintains the operational accuracy and stability of the fluid flow system 200 during the higher fluid flow conditions. Additionally, the necessity of having a technician available to adjust the fluid flow system 200 for operation at either low fluid flow conditions or changing cyclical flow demand conditions is eliminated.

Referring still to FIG. 2, the example self-adjusting amplifier valve 180 may be contained or housed in either the example regulator valve 220 or the pilot valve 160. In FIG. 2, the housing 221 includes an extension 221A shown in dotted line outline such that the example self-adjusting amplifier valve 180 may be contained in the housing 221 of the example regulator valve 220. Alternatively, the housing 161 may include an extension 161A shown in dotted and dashed line outline such that the example self-adjusting amplifier valve 180 may be contained in the housing 161 of the pilot valve 160. Also, either all or a part of the connection portion 146 may be contained in either the extension 22 1A of the regulator valve 220 or the extension 161A of the pilot valve 160.

Although certain example apparatus and methods have been On the contrary, this patent covers all methods, apparatus and articles of manufacture fairly falling within the scope of the appended claims either literally or under the doctrine of equivalents.

What is claimed is:

1. Fluid flow operated apparatus operating automatically in response to fluid flow changes to adjust automatically a gain of a regulated fluid flow system, comprising:
a self-adjusting fluid amplifier valve to receive fluid flow associated with an inlet of a regulator valve and to provide an adjusted fluid flow to a valve mechanism and to one side of a valve member of the regulator valve in response to the changes in fluid flow at an outlet of the regulator valve, the fluid amplifier valve having a flow pin at an amplifier orifice and the flow pin connected to the valve member of the regulator valve, wherein the changes in fluid flow at the outlet of the regulator valve cause the valve mechanism to regulate the adjusted fluid flow by responsively and simultaneously moving the valve member and the flow pin to vary automatically the gain of the regulated fluid flow system.

2. Apparatus as defined in claim 1, wherein the regulator valve regulates the flow of a gas.

3. Apparatus as defined in claim 1, wherein the fluid amplifier valve is part of the regulator valve.

4. Apparatus as defined in claim 1, wherein the fluid amplifier valve is part of the valve mechanism.

5. Apparatus as defined in claim 1, wherein the fluid amplifier valve includes a housing connected to the regulator valve.

6. Apparatus as defined in claim 1, wherein the valve member and the flow pin move a same amount when simultaneously moved by the valve mechanism.

7. Apparatus as defined in claim 1, wherein the valve member and the flow pin are connected by a fixed length travel connector.

8. Fluid flow operated apparatus operating automatically in response to fluid flow changes to adjust automatically a gain of a regulated fluid flow system, comprising:
   a self-adjusting fluid amplifier valve to receive fluid flow associated with an inlet of a regulator valve and to provide an adjusted fluid flow to a valve mechanism and to one side of a valve member of the regulator valve in response to the changes in fluid flow at an outlet of the regulator valve, the fluid amplifier valve having an amplifier housing, an amplifier inlet, an amplifier outlet, a flow pin at an amplifier orifice in an amplifier chamber, and the flow pin connected to the valve member of the regulator valve, wherein the changes in fluid flow at the outlet of the regulator valve cause the valve mechanism to regulate the adjusted fluid flow by responsively and simultaneously moving the valve member and the flow pin to vary automatically the gain of the regulated fluid flow system.

9. Apparatus as defined in claim 8, wherein the amplifier flow pin and amplifier orifice modify the fluid flow communicated to the inlet of the regulator valve and the amplifier inlet.

10. Apparatus as defined in claim 8, wherein the amplifier housing is part of the regulator valve.

11. Apparatus as defined in claim 8, wherein the valve member and the flow pin move a same amount when simultaneously moved by the valve mechanism.

12. Apparatus as defined in claim 8, wherein the valve member and the flow pin are connected by a fixed length travel connector.

13. Apparatus as defined in claim 12, wherein the fixed length travel connector is connected to the valve member through a spring force adjuster.

14. Apparatus as defined in claim 8, wherein the continuous fluid communication of the fluid amplifier with the outlet of the regulator valve includes fluid flow by way of the valve mechanism.

15. Apparatus as defined in claim 14, wherein the valve mechanism is fluid activated by sensing changes in fluid flow at the outlet of the regulator valve.

16. Apparatus as defined in claim 1, wherein the continuous fluid communication of the fluid amplifier with the outlet of the regulator valve includes fluid flow by way of the valve mechanism.

17. Apparatus as defined in claim 16, wherein the valve mechanism is fluid activated by sensing changes in fluid flow at the outlet of the regulator valve.

* * * * *